(12) United States Patent
Arvelo et al.

(10) Patent No.: US 6,890,011 B2
(45) Date of Patent: May 10, 2005

(54) ENERGY-ABSORBING BUMPER

(75) Inventors: Eduardo Arvelo, Derbyshire (GB); Gary Brown, Nuneaton (GB); Thomas Frank, Stuttgart (DE); Klaus Rathje, Hildrizhausen (DE); Maya Ziegs, Ammerbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/265,158

(22) Filed: Oct. 7, 2002

(65) Prior Publication Data

US 2003/0141728 A1 Jul. 31, 2003

(30) Foreign Application Priority Data

Oct. 5, 2001 (DE) .......................... 101 49 121

(51) Int. Cl.[7] .............................................. B60R 19/34
(52) U.S. Cl. ...................... 293/133; 293/120; 293/121
(58) Field of Search ................................ 293/133, 120, 293/132, 155, 109, 102, 121, 117; 296/189, 188, 136

(56) References Cited

U.S. PATENT DOCUMENTS

| | | | | |
|---|---|---|---|---|
| 3,722,876 A | * | 3/1973 | Schwenk .................... | 293/120 |
| 3,836,192 A | | 9/1974 | Wilfert | |
| 4,328,986 A | * | 5/1982 | Weller et al. ............... | 293/120 |
| 4,408,790 A | | 10/1983 | Shimoda et al. ............ | 293/122 |
| 4,762,352 A | | 8/1988 | Enomoto | |
| 4,941,701 A | * | 7/1990 | Loren ......................... | 293/120 |
| 4,968,076 A | * | 11/1990 | Kuroki ....................... | 293/121 |
| 4,482,180 A | | 12/1990 | Huber et al. ................ | 293/120 |
| 4,996,634 A | | 2/1991 | Haneda et al. | |
| 5,080,411 A | * | 1/1992 | Stewart et al. .............. | 293/122 |
| 5,100,187 A | | 3/1992 | Loren | |
| 5,106,137 A | * | 4/1992 | Curtis ........................ | 293/107 |
| 5,139,297 A | | 8/1992 | Carpenter et al. .......... | 293/132 |
| 5,139,304 A | * | 8/1992 | Tajiri .......................... | 293/117 |
| 5,201,912 A | * | 4/1993 | Terada et al. ............... | 293/133 |
| 5,265,925 A | * | 11/1993 | Cox et al. ................... | 293/120 |
| 5,785,367 A | | 7/1998 | Baumann et al. | |
| 5,803,514 A | * | 9/1998 | Shibuya et al. ............. | 293/133 |
| 5,984,389 A | * | 11/1999 | Nuber et al. ................ | 293/136 |

(Continued)

FOREIGN PATENT DOCUMENTS

| | | | |
|---|---|---|---|
| DE | 1755512 | 9/1974 | |
| DE | 2505169 | 8/1976 | |
| DE | 2505169 A1 | 8/1976 | |
| DE | 27 51 077 * | 5/1978 | |
| DE | 3009571 | 9/1981 | |
| DE | 3009571 A1 | 9/1981 | |
| DE | 32 24979 * | 8/1983 | |
| DE | 3125687 C2 | 9/1984 | ........... B60R/19/08 |
| DE | 3626150 C2 | 9/1984 | ........... B60R/19/18 |
| DE | 43 12517 * | 10/1994 | |
| DE | 4119640 C2 | 2/1996 | ........... B60R/19/18 |
| DE | 19806541 A1 | 9/1998 | ........... B60R/19/18 |
| DE | 10002724 A1 | 8/2001 | ........... B60R/19/22 |
| EP | 0734908 | 7/1998 | |
| EP | 1046546 A1 | 10/2000 | |
| EP | 1046546 | 10/2000 | |
| GB | 2033535 A | 5/1980 | |
| JP | 2 24240 * | 1/1990 | |
| JP | 3 273957 * | 12/1991 | |
| JP | 03273957 A | 12/1991 | |

OTHER PUBLICATIONS

European Search Report, Feb. 5, 2004.
German Search Report dated Sep. 18, 2003.

*Primary Examiner*—Kiran Patel
(74) *Attorney, Agent, or Firm*—Crowell & Moring LLP

(57) ABSTRACT

An energy-absorbing bumper with a structural part of foam material or the like which is arranged underneath an outer skin or shell, supports the outer skin or shell in a flexible manner and is arranged between a collision contact zone of the outer skin or shell and a rear side of the bumper.

13 Claims, 1 Drawing Sheet

U.S. PATENT DOCUMENTS

| | | | | |
|---|---|---|---|---|
| 6,089,628 | A | * | 7/2000 | Schuster .................... 293/120 |
| 6,227,582 | B1 | * | 5/2001 | Ichien ....................... 293/133 |
| 6,412,836 | B1 | * | 7/2002 | Mansoor et al. ............ 293/133 |
| 6,474,708 | B1 | * | 11/2002 | Gehringhoff et al. ....... 293/120 |
| 6,485,072 | B1 | * | 11/2002 | Werner et al. .............. 293/133 |
| 6,540,275 | B1 | * | 4/2003 | Iwamoto et al. ............ 293/120 |
| 2001/0026073 | A1 | * | 10/2001 | Sato et al. ................... 293/121 |
| 2002/0180224 | A1 | * | 12/2002 | Mansoor et al. ............ 293/120 |
| 2003/0020290 | A1 | * | 1/2003 | Cherry ....................... 293/120 |
| 2003/0052493 | A1 | * | 3/2003 | Ponsonnaille et al. ...... 293/102 |
| 2003/0080573 | A1 | * | 5/2003 | Marijnissen et al. ........ 293/132 |

\* cited by examiner

ENERGY-ABSORBING BUMPER

BACKGROUND AND SUMMARY OF THE INVENTION

This application claims the priority of Application No. 101 49 121.2-12, filed Oct. 5, 2001, in Germany, the disclosure of which is expressly incorporated by reference herein.

The invention relates to an energy-absorbing bumper with a structural part, which is arranged underneath an outer skin or shell with soft impact characteristics, supports the outer skin in a flexible manner and has a cross section that differs from the cross section of the outer skin or shell.

A bumper of this kind known from German Patent Document DE 25 05 169 A1 has a structural part made from elastic waste product components, which are embedded in a binder, in particular a reaction resin.

In the case of a bumper illustrated by way of example in DE 25 05 169 A1, the outer casing or shell comprises two separate shell components, which are very largely symmetrical with respect to a horizontal plane and are arranged as cantilevers in the region of a contact zone, which is the first to be subjected to loading when the vehicle collides with a pedestrian.

In German Patent Document DE 17 55 512 A and corresponding U.S. Pat. No. 3,836,192 covering parts of the outer surface of the outer skin of the vehicle are disclosed, in particular a passenger vehicle, that are at risk of impact with an elastically and/or plastically flexible plastic, in particular a foam. The hardness of the plastic layer may possibly decrease from the outside inwards. Hollow chambers, which are filled with a fluid that can yield when subjected to impact, are furthermore formed at particularly exposed locations, e.g. bumpers or front or rear flaps.

In European Patent Document EP 1 046 546 A1 a bumper designed essentially as a foam component is described. This bumper can have a central and an upper region that are set back relative to a lower edge region. Provision is furthermore made to design the lower region with increased stiffness. This is intended to ensure that collision forces take effect preferentially at a low level above the roadway in the event of accidents involving pedestrians.

According to German Patent Document DE 30 09 571 A1, the frontal area of a road vehicle, in particular a tram, is designed in such a way that, in the event of a collision with the vehicle, there is no possibility or a significantly reduced likelihood of a pedestrian being thrown to the side.

Finally, European Patent Document EP 0 734 908 A2 and corresponding U.S. Pat. No. 5,785,367 discloses a bumper that is designed as a beam and is supported on the longitudinal members of the body of a vehicle via deformation members of the impact-absorber type.

An aspect of the invention is to provide a bumper that is optimized with respect to the protection of pedestrians in collisions with the vehicle.

According to certain preferred embodiments of the invention, this aspect is achieved with a bumper of the type stated at the outset by virtue of the fact that the structural part is composed of foam capable of deformation and energy-absorbing compression or of a material having similar properties and a space-lattice structure that can be crushed in a manner that involves energy absorption, and is arranged between an impact or contact zone of the outer skin or shell and a rear side of the bumper facing away from the latter and having a cross section that differs from the outer skin or shell of the bumper.

The general idea of providing a very wide degree of freedom in the design of the shape of the outer skin or shell of the bumper and especially of designing the structural part with a resistance characteristic that is the optimum in collisions with pedestrians is provided. Since cross-sectional areas are left free by the structural part within the cross section of the outer skin or shell of the bumper, the material of the structural part can also be displaced quasi-hydraulically in a collision before the cross section of the generally relatively inelastic outer skin or shell, which is reduced by the respective collision, is completely filled by the material of the structural part. After the filling, absorption of the collision energy can take place basically only through the compressibility of the material of the structural part. In general, the quasi-hydraulic displacement of material and compression or crushing of the material of the structural part will take place simultaneously.

Owing to the difference in the cross sections of the outer skin or shell in the case of a flexible structural part, there is furthermore the advantage that the outer skin or shell will be displaced comparatively slightly in a tangential direction relative to the outer plane in the collision, thus enabling the consequences of a collision for a pedestrian to be significantly reduced even when the direction of the collision has a pronounced tangential component relative to the outer surface.

According to a particularly preferred embodiment of the invention, a reinforcing inner part, which can expediently be in the form of a flat strip, is arranged on the rear side of the bumper. As a result, collision forces which may be affecting a small area on the outside of the bumper are dissipated to vehicle components arranged behind the bumper over a comparatively large area.

The arrangement of the reinforcing inner part is particularly expedient if the bumper rests by way of this inner part on a beam capable of deformation in an energy-absorbing manner, which is intended generally not to be deformed when the vehicle collides with a pedestrian but to yield only in the case of higher forces.

This is because, especially in combination with the reinforcing inner part, it is possible to ensure that the beam yields inelastically only at a collision or impact energy exceeding a higher threshold and that the maximum degree of deformation of the structural part upon loading of a predetermined collision or contact area is used up only in the case of impact energy exceeding this threshold. Ultimately, this is equivalent to saying that, although collision forces acting on small areas of the outside can deform the bumper into the vicinity of its rear side, they cannot readily deform the beam as well.

Other objects, advantages and novel features of the present invention will become apparent from the following detailed description of the invention when considered in conjunction with the accompany drawings.

DETAILED DESCRIPTION OF THE DRAWINGS

Figure 1:
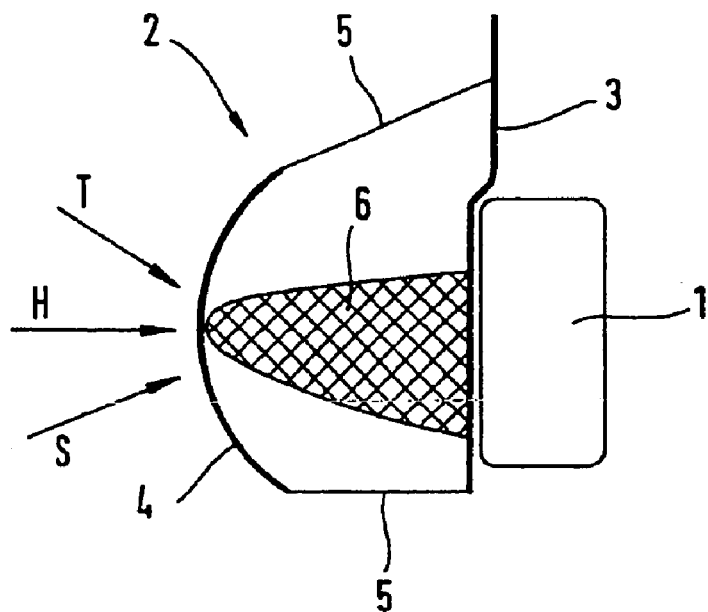
FIG. 1 shows a section through a first embodiment.

As shown in FIG. 1, a beam 1 capable of deformation in an energy-absorbing manner, which is part of a body structure (not shown specifically) of a passenger car, carries a bumper 2. This basically comprises a reinforcing inner part 3 in the form of a flat strip, which is arranged so as to rest on the beam 1, a bendable outer covering 4, which is connected to the reinforcing inner part 3 either directly or via bendable holder elements 5, and a foam structural part 6, which is arranged between the reinforcing inner part 3 and a contact zone of the outer covering 4. This zone is the zone that is likely to come into contact first with pedestrians during accidents in which the vehicle is involved.

According to certain preferred embodiments of the invention, the structural part 6 has a cross section that differs significantly from that of the outer covering 4, the cross-sectional shape of the structural part 6 being designed for optimum energy absorption when the vehicle is involved in collisions with pedestrians.

In the embodiment of FIG. 1, the height of the cross section of the foam structural part 6 increases in the direction of the reinforcing inner part. Moreover, the vertical center of the cross section of the foam structural part 6 is higher up vertically on the outer covering 4 than on the reinforcing inner part 3.

As a result, a progressively increasing resistance is produced by the foam structural part 6 in the event of horizontal impact loading in accordance with the arrow H. Moreover, an upward impact in the direction of the arrow S meets a lower resistance than a downward impact in the direction of the arrow T.

During the deformations of the foam structural part 6 caused by a collision, it is possible, on the one hand, for deformation through quasi-hydraulic displacement of material of the foam structural part to take place transversely to the respective direction of impact. On the other hand, there is also deformation involving a reduction in the volume of the foam structural part.

As long as the said deformations are relatively small, they may be reversible, i.e. the foam structural part 6 and the likewise deformed outer covering 4 can reassume their original form. However, it is important that the deformations should take place in an inelastic manner or with energy absorption, i.e. should involve conversion of mechanical impact energy into heat, and that the reverse deformation takes a relatively long time.

Figure 2:
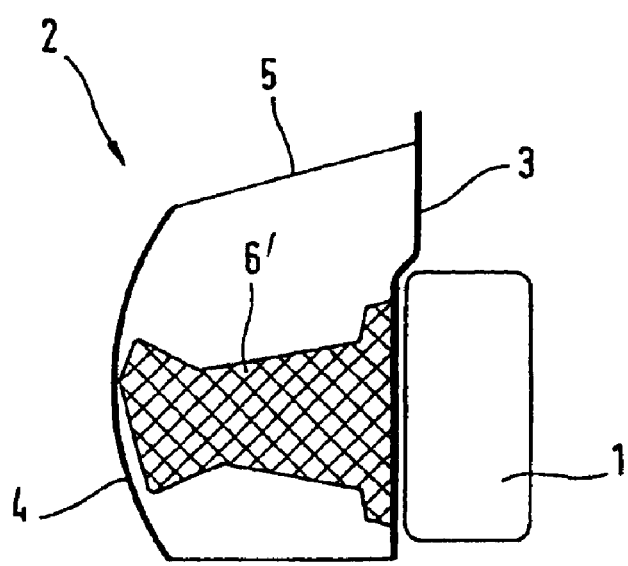
FIG. 2 shows a section of a modified embodiment.

The embodiment shown in FIG. 2 differs from the embodiment in FIG. 1 in that the foam structural part 6' has a different cross section. In FIG. 2, the structural part 6' has a cross section with a larger vertical height in the collision contact zone of the outer covering 4. Only at a relatively large distance from the collision contact zone is a significant reduction in the cross section provided, which then moreover increases again towards the reinforcing inner part 3. There is a marked increase in the cross section in the vertical direction near the reinforcing inner part 3.

Since the foam structural part 6' is at a greater horizontal distance from the reinforcing inner part 3 in an upper region of the contact zone of the outer covering 4 than in a lower region, the foam structural part 6' is additionally subjected to bending when horizontal collision forces initially act on the above-mentioned upper zone. In the embodiment of FIG. 2, the region of the structural part in front of the reduction in cross section which is adjacent to the outer covering 4 tends to rotate in the clockwise direction under the influence of the above-mentioned collision forces.

The structural part 6, 6' can be composed of a plastic foam, preferably with a closed cell structure. In principle, however, other materials are also suitable, e.g. metal foams or plastic or metal webs.

To adapt its stiffness to different conditions, the design of the structural part 6, 6' can be varied locally across the width of the vehicle, i.e. the cross section and/or density of the material of the structural part is/are adapted to different points of impact of the pedestrian, to the respective characteristics of the vehicle structure or to integrated components such as fog lamps or supports for registration plates or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy-absorbing bumper comprising a structural part which is arranged underneath an outer skin or shell, supports the outer skin in a flexible manner and has a cross section that differs from a cross section of the outer skin or shell, wherein the structural part is composed of foam capable of deformation and energy-absorbing compression or of a material having similar properties and a space-lattice structure that can be crushed in a manner that involves energy absorption, the structural part being arranged between an impact or contact zone of the outer skin or shell and a rear side of the bumper facing away from the impact or contact zone, and having a vertical height in at least one section of the structural part which increases between the impact or contact zone and the rear side of the bumper such that a vertical gap between the structural part and the outer skin or shell over the at least one section decreases between the impact or contact zone and the rear side of the bumper, and the structural part further being arranged with a vertical center of a portion adjacent to the impact or contact zone of the bumper being vertically higher than a vertical center of a portion adjacent to the rear side of the bumper such that an upward impact to the bumper is met with less resistance than a downward impact to the bumper.

2. The bumper according to claim 1, wherein a reinforcing inner part is arranged on the rear side.

3. The bumper according to claim 2, wherein the reinforcing inner part is in a form of a flat strip.

4. The bumper according to claim 2, wherein the bumper rests by way of the reinforcing inner part on a beam capable of deformation in an energy-absorbing manner, which is deformed only at a relatively high collision energy.

5. The bumper according to claim 3, wherein the bumper rests by way of the reinforcing inner part on a beam capable of deformation in an energy-absorbing manner, which is deformed only at a relatively high collision energy.

6. The bumper according to claim 4, wherein the beam yields inelastically only at an impact energy that exceeds a threshold, and a maximum degree of deformation of the structural part upon loading of a predetermined contact area is used up only at an impact energy that exceeds the threshold.

7. A bumper comprising:
   an outer shell having an impact or contact zone,
   a structural part being arranged inward of the outer shell and flexibly supporting the outer shell, the structural part having a cross section that differs from a cross section of the outer shell, and
   an inner side facing away from the impact contact zone,
   wherein the structural part comprises a material capable of deformation and energy-absorbing compression and having a space-lattice structure adapted to be crushed in a manner that involves energy absorption, wherein the structural part is arranged between the impact or contact zone and the inner side of the bumper, wherein the structural part has a vertical height in at least one section of the structural part which increases between the impact or contact zone and the rear side of the bumper such that a vertical gap between the structural part and the outer skin or shell over the at least one section decreases between the impact or contact zone and the rear side of the bumper, and wherein the structural part is arranged with a vertical center of a portion adjacent to the impact or contact zone of the bumper located vertically higher than a vertical center of a portion adjacent to the rear side of the bumper such that an upward impact to the bumper is met with less resistance than a downward impact to the bumper.

8. The bumper according to claim 7, wherein a reinforcement is arranged on the inner side.

9. In a bumper of a vehicle, a structural part is arranged behind an outer skin to support the outer skin in a flexible manner and has a cross section that differs from a cross section of the outer skin, the structural part comprising a foam or material capable of deformation and energy-absorbing compression with a space-lattice structure that is crushable, wherein the structural part is arranged between an impact or contact zone of the outer skin and a rear side of the bumper facing away from the impact or contact zone and has a vertical height in at least one section of the structural part which increases between the impact or contact zone and the rear side of the bumper such that a vertical gap between the structural part and the outer skin or shell over the at least one section decreases between the impact or contact zone and the rear side of the bumper, and the structural part further is arranged with a vertical center of a portion adjacent to the impact or contact zone of the bumper being vertically higher than a vertical center of a portion adjacent to the rear side of the bumper such that an upward impact to the bumper is met with less resistance than a downward impact to the bumper.

10. A method of making an energy-absorbing bumper, comprising:

arranging a structural part underneath an outer skin or shell to operatively support the outer skin in a flexible manner, the structural part having a cross section that differs from a cross section of the outer skin or shell and having a vertical height which increases between the impact or contact zone and the rear side of the bumper such that a vertical gap between the structural part and the outer skin or shell decreases between the impact or contact zone and the rear side of the bumper, and further arranging the structural part between an impact or contact zone of the outer skin or shell and a rear side of the bumper facing away from the impact or contact zone, wherein the structural part is composed of foam or a material operatively capable of deformation and energy-absorbing compressor and having a space-lattice structure crushable in a manner that involves energy absorption.

11. The energy-absorbing bumper of claim 1, wherein the structural part cross section is arranged to provide greater resistance to an obliquely downward impact to the bumper than to an obliquely upward impact to the bumper.

12. The bumper according to claim 1, wherein the structural part is arranged such that a first portion adjacent to the outer skin and a second portion adjacent to the rear side of the bumper have vertical heights greater than a reduced-height portion disposed between the first and section portions.

13. The bumper of claim 1, wherein the cross section of the structural part is substantially smaller than that of the outer skin or shell, such that on impact with a pedestrian the outer skin or shell deforms to a substantial extent prior to substantial structural part deformation.

* * * * *